United States Patent [19]
Chaklader

[11] Patent Number: 5,675,314
[45] Date of Patent: Oct. 7, 1997

[54] TIRE PRESSURE SENSOR

[75] Inventor: Asoke Chandra Das Chaklader, Vancouver, Canada

[73] Assignee: The University of British Columbia, Vancouver, Canada

[21] Appl. No.: 599,000

[22] Filed: Feb. 9, 1996

[51] Int. Cl.⁶ ................................................. B60C 23/00
[52] U.S. Cl. ........................ 340/443; 340/442; 340/444; 340/445; 73/146.5; 200/61.22
[58] Field of Search ............................. 340/443, 442, 340/444, 445, 446–448, 525; 73/146.5; 200/61.22

[56] References Cited

U.S. PATENT DOCUMENTS 4,119,944 10/1978 Smith ........................................ 340/447
5,231,391 7/1993 Rigaux ...................................... 340/442
5,285,189 2/1994 Nowicki et al. ........................ 340/447
5,289,160 2/1994 Fiorletta .................................... 340/442
5,349,328 9/1994 Lonzame .................................. 340/442

Primary Examiner—Donnie L. Crosland
Attorney, Agent, or Firm—C. A. Rowley

[57] ABSTRACT

A pressure sensing system is formed by a sensor mounted one to rotate with each tire and adapted to sense the pressure in the tire and generate a signal corresponding to the tire pressure, a movable contact system is moved into an operative position only when the vehicle is stopped and provides power (if required) to the sensor and contacts to deliver the electrical signals indicative of the tire air pressure to the vehicle body where it may be displayed for the operator's convenience.

18 Claims, 6 Drawing Sheets

TIRE PRESSURE SENSOR

FIELD OF INVENTION

The present invention relates to tire pressure sensor, more particularly, the present invention relates to a tire pressure sensor system that delivers tire pressure information onto the vehicle for easy access by the operator.

BACKGROUND OF THE INVENTION

Many different techniques have been proposed for sensing the pressure in tire and for delivering this information to the operator at a central location on the vehicle so that he knows that a tire is at low or high air pressure.

These pressure sensors generally communicate with the vehicle so that the sensed pressure is displayed to the operator when the vehicle is moving, i.e. the wheel rotating relative to the body of the vehicle. Such devices are generally relatively complex and expensive or alternatively are not particularly robust.

One type of tire sensor senses deformation of the tire as shown, for example, in U.S. Pat. No. 5,349,328 issued Sep. 20, 1994 to Lomzame. This system is relatively inexpensive and the sensor is fixed to the body so no rotating electrical contact between the rotating wheel and the chassis is required. In this system, a sensor rod is deflected by contact with the tire side wall when the side wall of the tire is deformed as occurs when the tire pressure is low. This system provides an indication of low tire pressure but is not robust. For example mud or other debris on the wheels may cause faulty readings. Furthermore, this system provides an indication only when the tire pressure is reduced significantly as is necessary for significant tire bulge to occur. Clearly such a system simply cannot provide a reading of actual tire pressure.

In another form of fixed sensor the height of the vehicle is detected and when the this height is reduced, it is deemed tire pressure is low. However, if the tire in a rut or is parked on uneven ground, a faulty low pressure reading is likely to be generated.

More complicated system which are capable of monitoring tire pressure, for example, U.S. Pat. No. 5,231,391 issued Jul. 27, 1993 to Rigaux discloses a system using a rotating encoder formed by a multipolar ring of magnetic segments of different polarity that are distributed circumferentially in a regular and alternating manner. A transmitter coil coaxial with the ring and a fixed pickup (an induction coil system) is energized by alternating electrical current flowing through the transmitter coil to generate a magnetic field superimposed on the magnetic field created by the multipolar ring generates a signal picked up and delivers a signal relating the rotating characteristic of the wheel and thus, the state of the tire.

U.S. Pat. No. 5,289,160 issued Feb. 26, 1994 to Florletta describes a wheel system wherein each sensor on each wheel is provided with a radio transmitter that transmit the information on tire pressure, etc. from the wheel to a radio receiver on the body of the vehicle and this transmitted signal is decoded to provide information on tire pressure etc. and makes it available to the operator.

It will be apparent that each of these systems is either relatively complex and therefore expensive or is likely to have significant reliability problems.

BRIEF DESCRIPTION OF THE PRESENT INVENTION

It is an object of the present invention to provide an inexpensive system for sensing tire pressure and delivering such information to an operator.

Broadly, the present invention relates to a system for indicating the degree of inflation of a rotatable tire of a vehicle comprising means rotatable with said tire for sensing tire pressure of said tire, indicator display means on said vehicle, an annular contact mean connected to said sensor mean and rotatable with said tire, said annular contact means having a plurality of annular contacts for delivering signals from said sensor means, a movable contact means having contact elements one for each of said annular contact, means to move said movable contact means between an active position wherein each said element contacts a corresponding one of said annular contacts and a base retracted position wherein said elements are clear of said annular contacts, means for biasing said means to move to said base retracted position, said contact elements when said movable contact means is in said active position electrically connecting said sensor means to said indicator display means, means to control said means to move, said means to control including means to prevent said means to move from positioning said movable contact means in said active position when said tire is rotating relative to said vehicle whereby said movable contact means is in said base retracted position when said tire is rotating and may only be moved to active position when said means to prevent is overridden.

Preferably, said annular contacts are annular conductive strips covered by penetrable protective coating and said elements have sharp points that are projected through said coating when said contact means is moved into said active position.

Preferably, said contact elements include spring means resiliently urging said contact elements to an extended position Preferably, said spring means independently urges each of said contact elements of said extended position.

Preferably, said means to prevent comprises a timer activated switch which is closed for a preselected time period after activation of said timer and a motion detector activated switch connected in series with a power source for operating said means to move whereby if either said timer switch or said motion detector switch is open said means to biasing means holds said contact means in said base retracted position.

Preferably, said timer means is activated when an ignition switch for said vehicle is moved to an on position and said timer means holds said timer switch closed for a preselected time.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
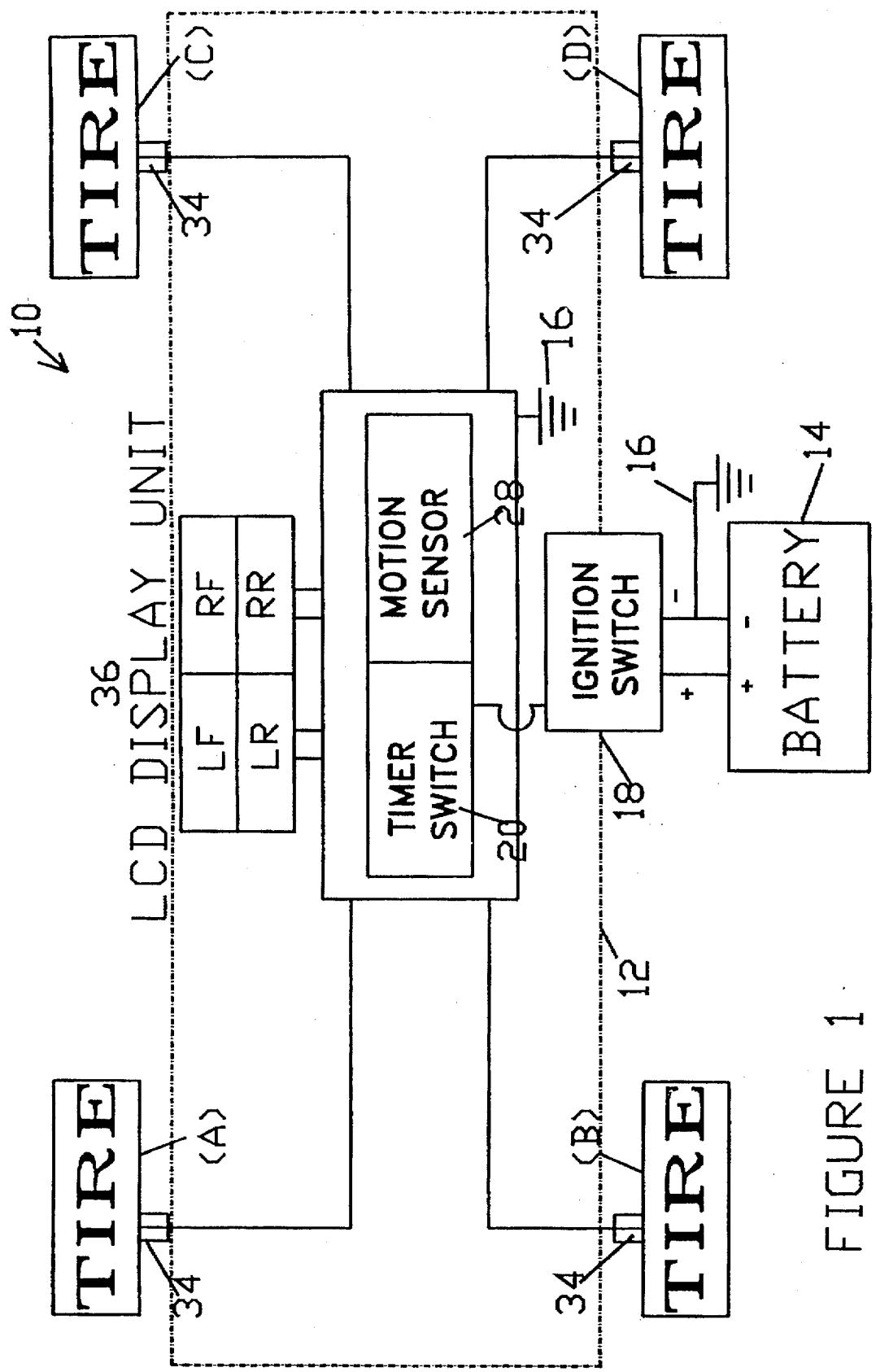
FIG. 1 is a schematic illustration of the system of the present invention.

As shown in FIG. 1, the system is provided on vehicle 10 which has a body section 12 outlined in dot-dash line and wheels with inflated tires indicated as A, B, C and D. The tire air pressure monitoring system of the present invention is electrically operated and derives its power from the battery 14, one side of which, preferably the negative side, is connected to ground as indicated at 16 and the other or positive side is connected through an ignition switch 18 to activate a timer 20 which, when the ignition switch 18 is initially turned on, closes a switch 22 (see FIG. 2) in the line 24 leading to the pickup solenoid or sensor actuator, as will be described hereinbelow, is indicated at 26 (see FIG. 3). The timer switch 22 and the motion detector switch 30 individually and in combination provide a means to prevent activation of the solenoid unless certain conditions are met.

A motion detector 28 controls a switch 30 by holding the switch 30 in closed (conducting) position if no motion is sensed but is immediately moves the switch 30 to an open (non-conducting) position (not shown) to break the connection in line 24 and disconnect the pickup or activating solenoids 26.

Figure 2:
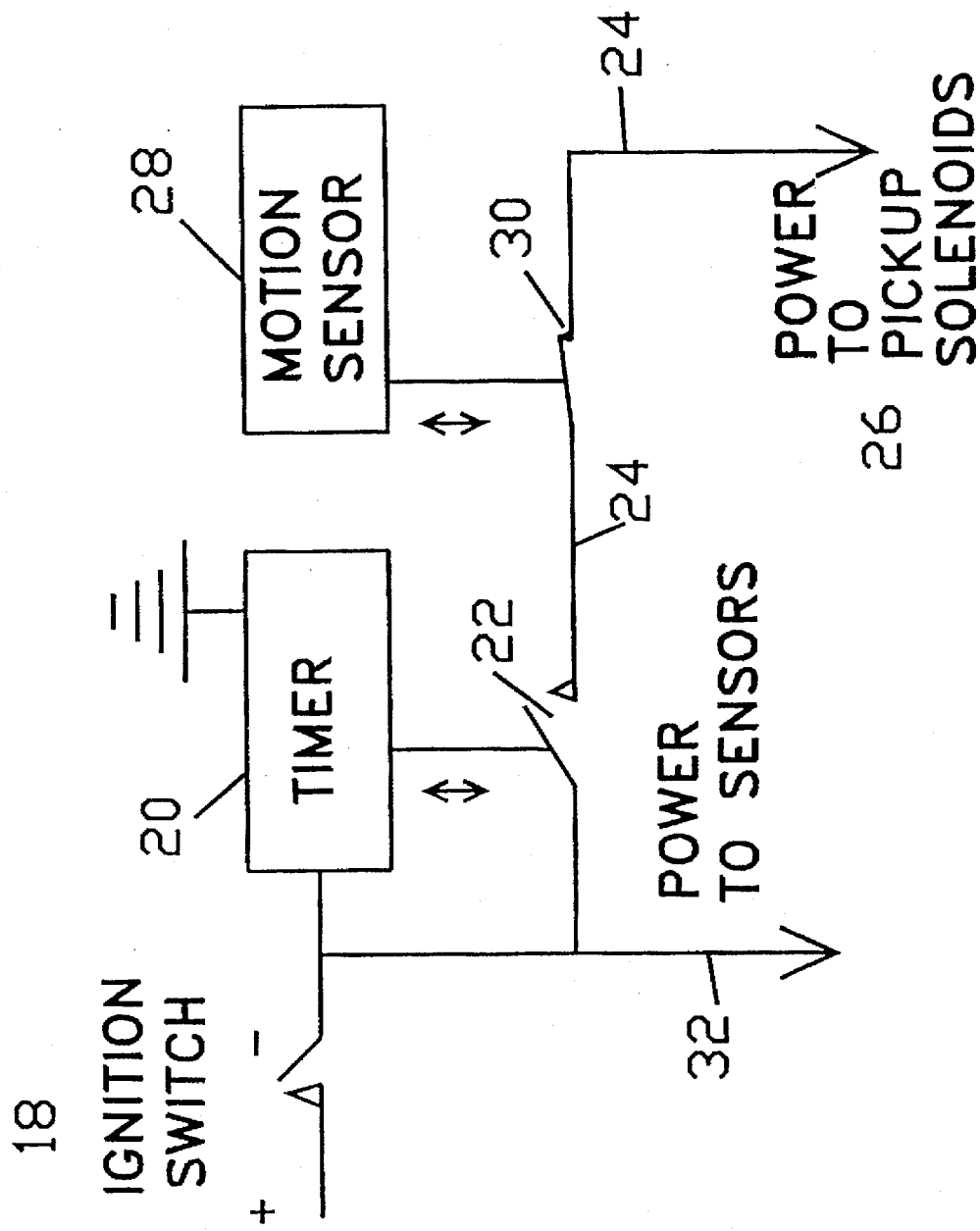
FIG. 2 is a schematic wiring diagram showing simplified form of the control of the actuating solenoid.

The solenoids each have a base retracted position to which the solenoid (and the contact elements mounted thereon is driven, for example, by a spring or the like as represented by the arrow 25 so that the retracted position is a fail safe position with the electrical contact elements 66, 68 and 70 withdrawn as will be described below To review, as shown in FIG. 2, when the ignition switch 18 is initially closed, the timer 20 is activated and closes the switch 22 and since the switch 30 will normally be closed if the vehicle is not in motion, power is sent to the solenoids 26 via the line 24 until the timer 20 completes its cycle at which time the switch 22 will open. The timer is set to provide sufficient time (e.g. about 10 to 60 seconds) for the operator to read the pressures in the tires A, B, C and D as will be described below.

In the illustrated arrangement, the line 32 delivers power to the sensor system 34 and via one of the movable contact elements 66, 68 or 70 delivers power to the pressure sensor 62 on the wheel (A, B, C, or D) when the solenoids 26 are activated, if power is required to operate the sensor which of course will depend on the type of sensor being used.

Referring back to FIG. 1, a sensor system 34 is provided on each of the wheels A, B, C and D and each sensor system 34 includes a set of non-rotating contact elements 66, 68 and 70 mounted for movement by the solenoid 26 and a set of movable contact (annular contact ribbons 52, 54 and 56) that are mounted to rotate with the sensor 62 that is fixed relative to the wheel.

When the solenoids 26 are activated, the sensor systems 34 feeds back signals to the display unit 36 on chassis 12 (see FIG. 1). The digital display unit 36 displays the left front displays the left front tire pressure as indicated by display unit LF, the right front tire pressure as indicated by display unit RF, the left rear tire tire pressure as indicated by display unit LR and the right rear tire tire pressure as indicated by display unit RR. These display units indicate the tire pressure in their respective tire when both the timer switch 22 and the motion detector switch 30 are in the closed (conducting) position and the solenoid 26 for each of the tires is activated. If the system is employed with vehicles having more (or less) tire that are to be monitored obviously the number of sensors and the number of displays will be changed as required.

Figure 3:
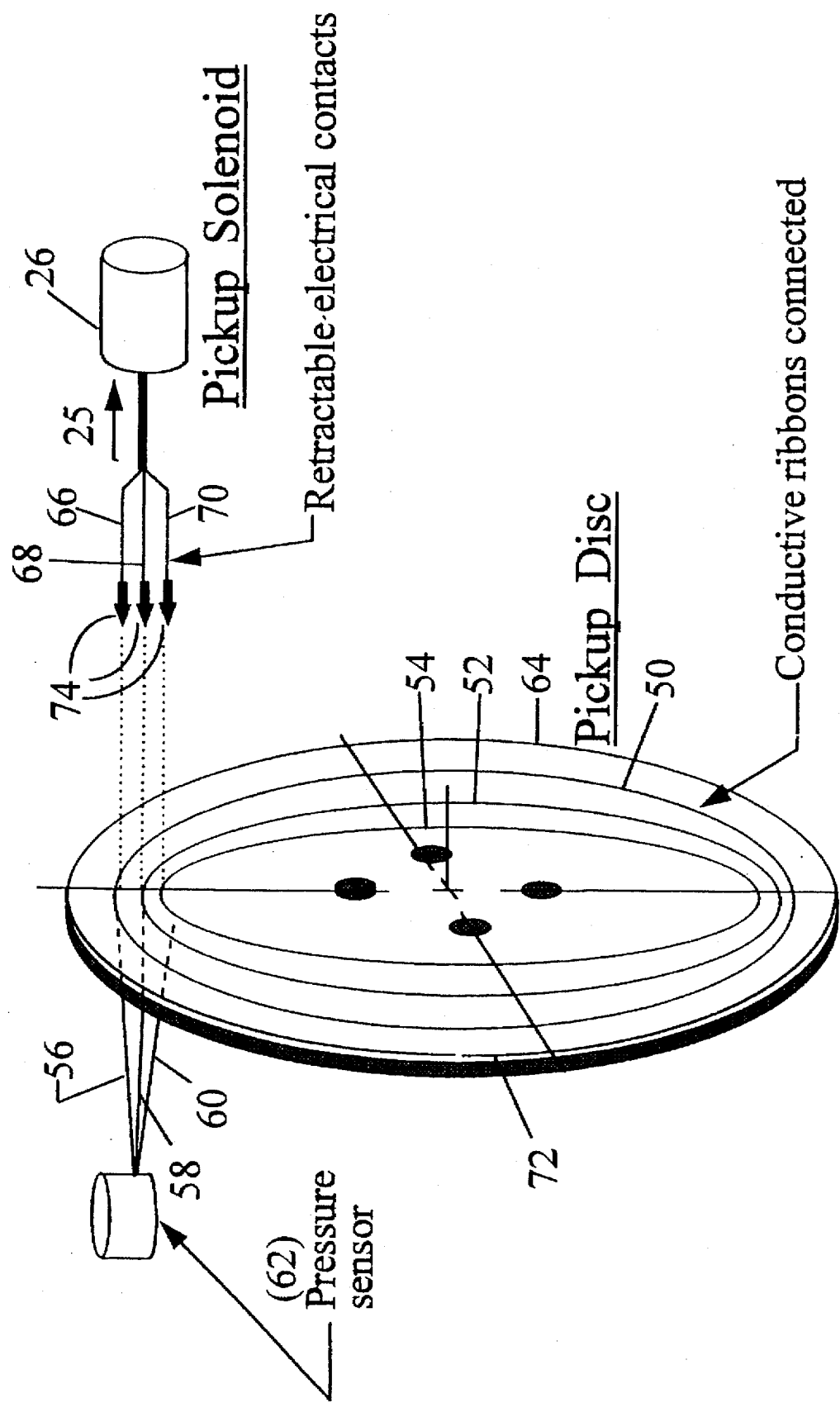
FIG. 3 is a schematic isometric illustration of the contact system for delivering power to the sensor and signals from the sensor.

Attention is directed to FIG. 3 which further illustrates one form of the sensor system 34, which includes three annular contact ribbons 50, 52 and 54 that are connected via lines 56, 58 and 60 to the pressure sensor 62 mounted on the wheel and in communication with the tire to determine the air pressure or sense the air pressure within its tire. In the version illustrated in FIG. 3, the annular contact rings 50, 52 and 54 are mounted on a disk 64 which rotates with the wheel. In the illustrated arrangement, the side of the disk to be contacted by the movable, retractable, electrical contact elements 66, 68 and 70 is covered by a protective coating 72 which overlies the front face of the disk 64 (face facing the contacts 66, 68 and 70). Obviously it is unnecessary to cover the whole face of the disk with coating, only the conductor strips need be protected and thus only the strips need be coated sufficiently to protect them. One system for mounting the annular conductive strips or ribbons 50, 52 and 54 is to place them in a groove and then fill the groove with the protective coating. Obviously the ribbons must each be electrically isolated from the other and from the disk or mounting e.g. wheel rim.

Each of these contact elements 66, 68 and 70 is provided with a sharpen end point 74 which will penetrate the coating 72 when the solenoid 26 is activated to move the contacts 66, 68 and 70 toward the disk 64. i.e. extension of the solenoid 26 to activated position forces the sharpen ends 74 through the protective coating 72 and into contact with the annular connectors 50, 52 and 54 respectively.

Figure 4:
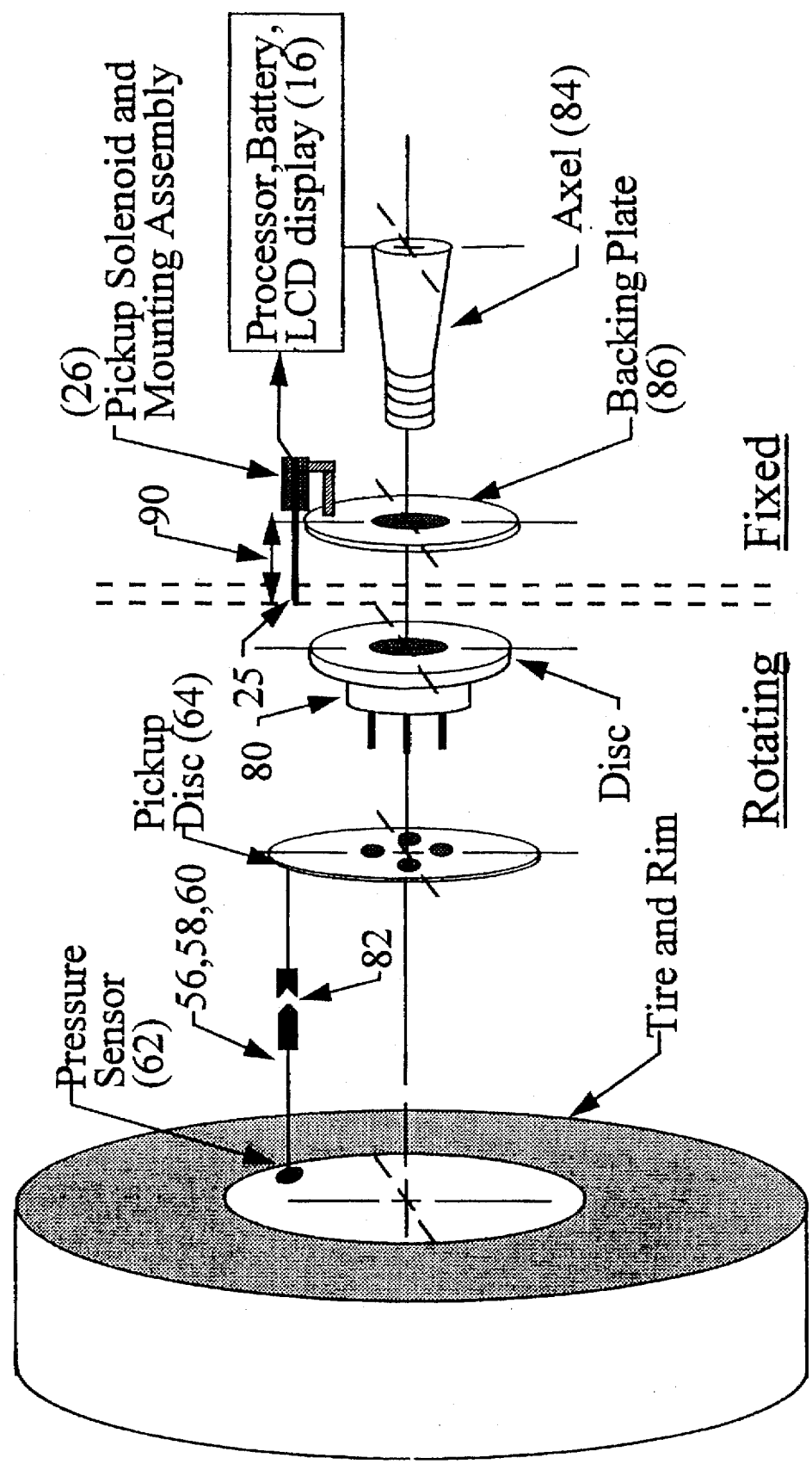
FIG. 4 schematically illustrates in exploded form a system that could be used with disk brakes.

In the arrangement shown in FIG. 4, the pickup disk 64 is shown in position to be mounted on the disk 80 of the disk brake and is connected to the pressure sensor 62 via the connectors schematically indicated at 82, i.e. equivalent to the wires 56, 58 and 60. Mounted fixed to the axial 84 is a backup plate 86 to which the pickup solenoid 26 is fixed.

In this illustration to the left of the two vertical dotted lines, all of the elements rotate with the wheel, whereas those elements to the right of the two vertical dotted lines are fixed to the chassis.

Figure 5:
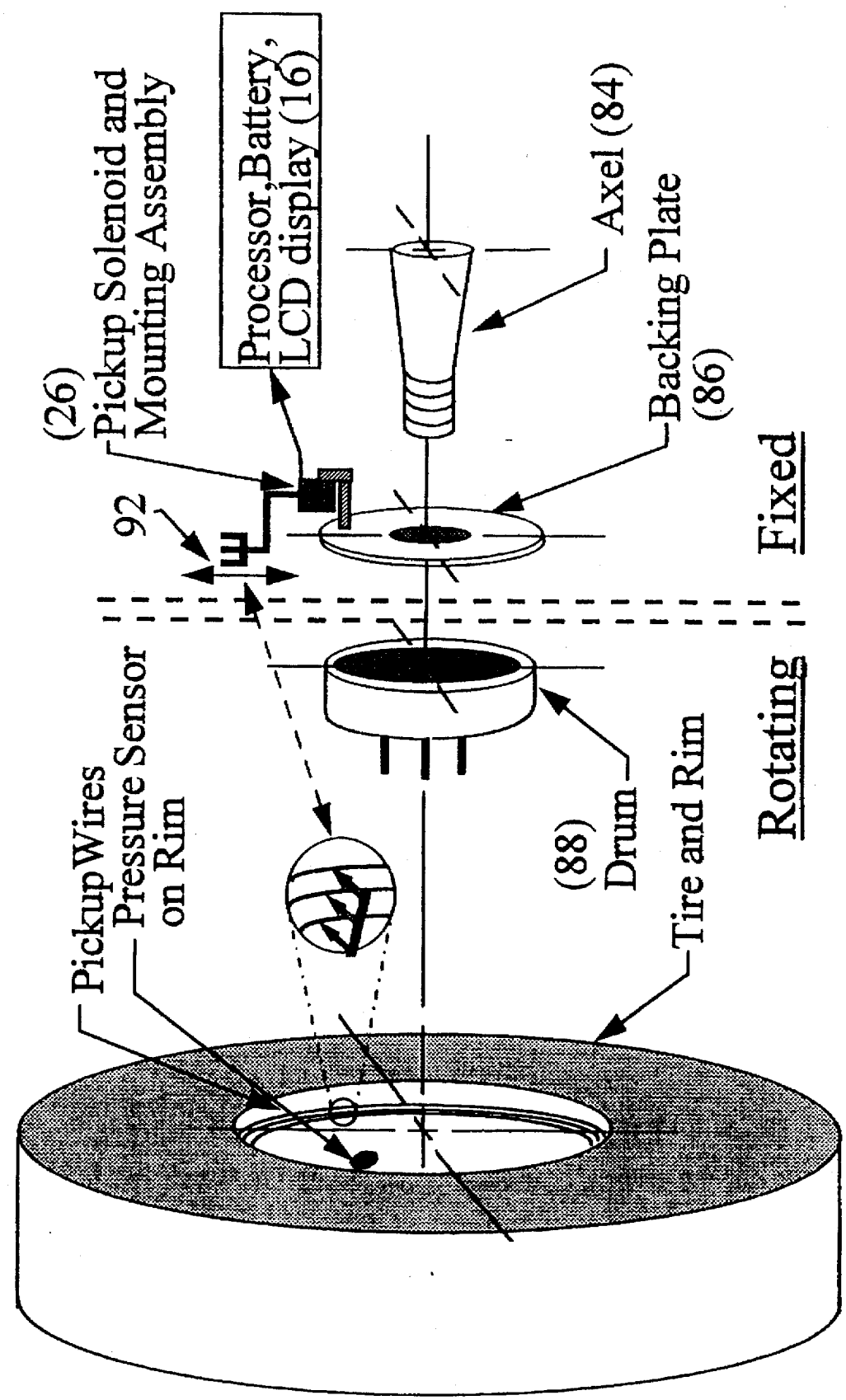
FIG. 5 is an exploded schematic illustration of the application of the system to a wheel provided with a drum-typed brake.

The system shown in FIG. 5 is essentially the same as the system shown in FIG. 4 with the exception that a brake drum 88 replaces the disk 80 and the annular conducting ribbons extends circumferentially around the inner side of the wheel rim so that they in effect to form a right circular cylinder as opposed to a flat disk. However, other than this, the ribbon connections will be the same and the protective 72 will simply overlie these contacts. Obviously, this positioning of the annular ribbons requires that the motion of the solenoid 26 be at right angles to the motion of the solenoid shown in FIG. 4, i.e. in FIG. 4, the motion of the solenoid is indicated by the arrow 90 is substantially parallel to the axis of rotation whereas in FIG. 5, the movement of the solenoid as indicated by the arrow 92 is substantially radial to the axis or rotation of the tire. It is preferred to have the solenoid move the contacts in an axial direction relative to the axis of rotation i.e. as shown in FIG. 4, but in those cases where the wheel structure does not easily accommodate such a system radial movement of the contacts by the solenoid will be used as indicated in FIG. 5. While the system of FIG. 4 has been shown with disk brakes and the system of FIG. 5 with drum brakes the systems may be interchange and the system of FIG. 5 used with disk brake or the system of FIG. 4 with drum brakes, if the wheel configuration is suitable.

The contacts 66, 68 and 70 will now be described in more detail with in relation to FIGS. 6, 7, 8 and 9. In each case, a block 100 is mounted on the solenoid rod 102 and is thus moved by action of the solenoid 26 when the solenoid 26 is activated from a retracted or inactive position as illustrated to an active position wherein the contact elements 66, 68 and 70 are projected forward as indicated by the arrow 104 to drive the sharpen ends 74 through the protective coating 72 and into contact with their respective ribbons 50, 52 and 54.

In the arrangement shown in FIG. 6, the contact elements 66, 68 and 70 are simply clamped in an insulated block and the wiring connections are connected from these contact elements 66, 68 and 70 to their respective display 36 (in each of the below described embodiments the contact elements 66, 68 and 70 are similarly connected to their respective portion of the display 36).

Figure 7:
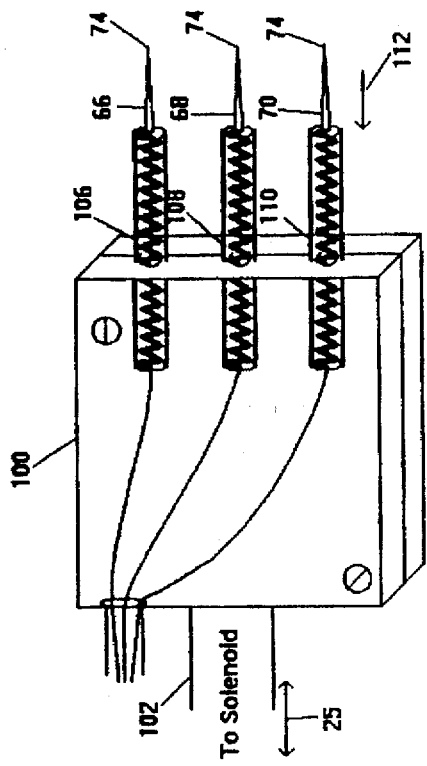
FIG. 7 schematically shows a system wherein each of the contact elements is individually spring biased.

In the FIG. 7 embodiment, a spring schematically indicated at 106, 108 and 110 is used to bias its respective the contact elements 66, 68 and 70 to an extended position while permitting each one of these contacts 66, 68 or 70 to independently move rearwardly, i.e. in the direction of the arrow 112. This springing of the contact elements better ensures that the coating 72 is not damaged should there be some relative movement between the contacts 66, 68 or 70 and their respective rings 54, 52 and 50 i.e. such movement will simply drive the contact elements in the direction of the arrow 112 to minimize any damage to the coating 72.

Figure 6:
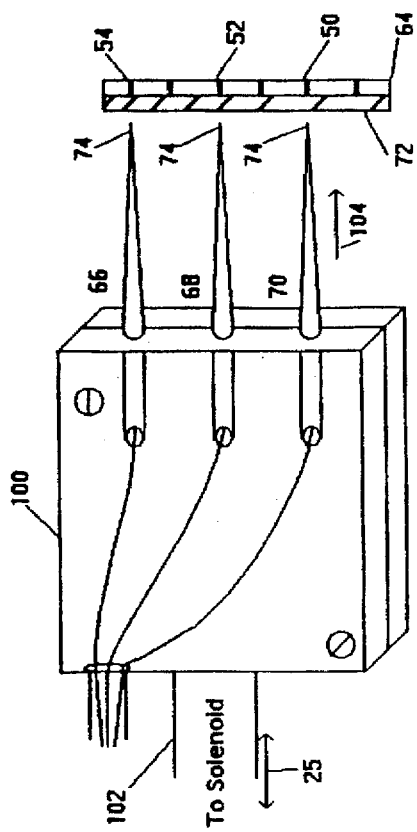
FIG. 6 schematically shows a simple version of contact elements for use with the present invention.
Figure 8:
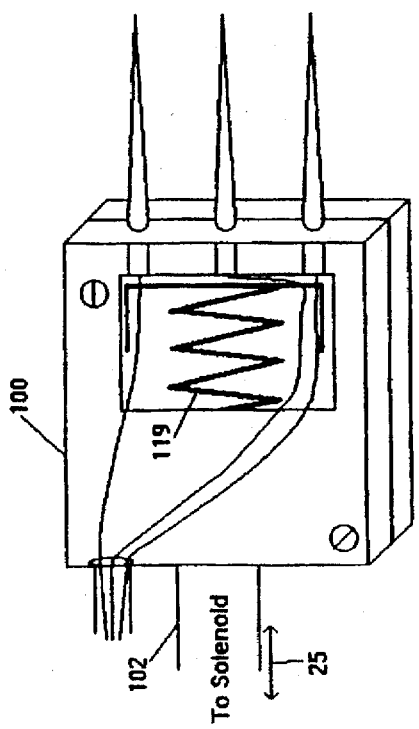
FIG. 8 schematically shows a system where a single spring is used to bias all of the contact elements.

FIG. 8 shows a system similar to FIG. 6 and 7 but wherein in a single spring 114 biases all of the contact elements 66, 68 and 70 in the direction of the arrow 104 while permitting movement of all simultaneously in the direction of the arrow 112.

Figure 9:
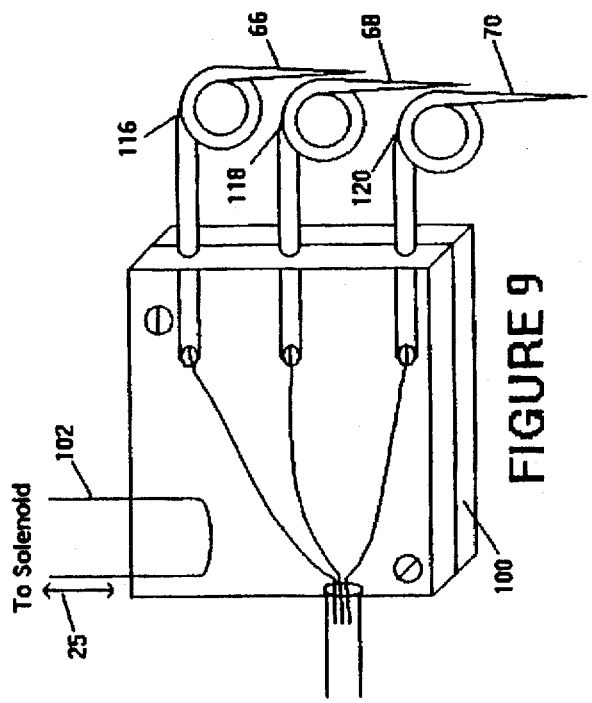
FIG. 9 schematically shows a system wherein a loop-typed spring is provided in each of the contact elements.

In the embodiment of FIG. 9, each of the contact elements 66, 68 and 70 is wound to form its respective coil springs 116, 118 and 120 each of which operates similarly to its corresponding springs 106, 108 and 110 in the FIG. 7 embodiment to permit rearward movement should the vehicle accidentally be put into motion when the solenoid 26 is in extended position and the contact elements are in their active position.

Having described the invention, modifications will be evident to those skilled in the art without departing from the scope of the invention as defined in the appended claims.

I claim:

1. A system for indicating inflation pressure of a rotatable tire of a vehicle comprising sensor means rotatable with said tire for sensing tire pressure of said tire, inflation pressure indicator display means on said vehicle an annular contact means connected to said sensor means and rotatable with said tire, said annular contact means having a plurality of annular contacts for delivering signals from said sensor means, a movable contact means having contact elements one for each of said annular contact means to move said movable contact means between an active position wherein each said contact element contacts a corresponding one of said annular contacts and a base retracted position wherein said elements are clear of said annular contacts, means for biasing said means to move to said base retracted position, said contact elements when said moveable contact means is in said active position electrically connecting said sensor means to said inflation pressure indicator display means, means to control said means to move, said means to control including means to prevent said means to move from positioning said moveable contact means in said active position when said tire is rotating relative to said vehicle whereby said movable contact means is in said base retracted position when said tire is rotating and may only be moved to active position when said means to prevent is overridden.

2. A system for indicating tire pressure as defined in claim 1 wherein said annular contacts are annular conductive strips covered by penetrable protective coating and said elements have sharp points that are projected through said coating when said contact means is moved into said active position.

3. A system for indicating tire pressure as defined in claim 1 wherein said contact elements include spring means resiliently urging said contact elements to an extended position.

4. A system for indicating tire pressure as defined in claim 2 wherein said contact elements include spring means resiliently urging said contact elements to an extended position.

5. A system for indicating tire pressure as defined in claim 3 wherein said spring means independently urge each of said contact elements to said extended position.

6. A system for indicating tire pressure as defined in claim 4 wherein said spring means independently urge each of said contact elements to said extended position.

7. A system for indicating tire pressure as defined in claim 1 wherein said means to prevent comprises a timer, a timer activated switch which is closed for a preselected time period after activation of said timer and a motion detector activated switch connected in series with a power source for operating said means to move whereby if either said timer switch or said motion detector switch is open, said means for biasing holds said contact means in said base retracted position.

8. A system for indicating tire pressure as defined in claim 2 wherein said means to prevent comprises a timer, a timer activated switch which is closed for a preselected time period after activation of said timer and a motion detector activated switch connected in series with a power source for operating said means to move whereby if either said timer switch or said motion detector switch is open, said means for biasing holds said contact means in said base retracted position.

9. A system for indicating tire pressure as defined in claim 3 wherein said means to prevent comprises a timer, a timer activated switch which is closed for a preselected time period after activation of said timer and a motion detector activated switch connected in series with a power source for operating said means to move whereby if either said timer switch or said motion detector switch is open, said means for biasing holds said contact means in said base retracted position.

10. A system for indicating tire pressure as defined in claim 4 wherein said means to prevent comprises a timer, a timer activated switch which is closed for a preselected time period after activation of said timer and a motion detector activated switch connected in series with a power source for operating said means to move whereby if either said timer switch or said motion detector switch is open, said means for biasing holds said contact means in said base retracted position.

11. A system for indicating tire pressure as defined in claim 5 wherein said means to prevent comprises a timer, a timer activated switch which is closed for a preselected time period after activation of said timer and a motion detector activated switch connected in series with a power source for operating said means to move whereby if either said timer switch or said motion detector switch is open, said means for biasing holds said contact means in said base retracted position.

12. A system for indicating tire pressure as defined in claim 6 wherein said means to prevent comprises a timer, a timer activated switch which is closed for a preselected time period after activation of said timer and a motion detector activated switch connected in series with a power source for operating said means to move whereby if either said timer switch or said motion detector switch is open, said means for biasing holds said contact means in said base retracted position.

13. A system for indicating tire pressure as defined in claim 7 whereto said timer means is activated when an ignition switch for said vehicle is moved to an on position and said timer means holds said timer switch closed for a preselected time.

14. A system for indicating tire pressure as defined in claim 8 wherein said timer means is activated when an ignition switch for said vehicle is moved to an on position and said timer means holds said timer switch closed for a preselected time.

15. A system for indicating tire pressure as defined in claim 9 wherein said timer means is activated when an ignition switch for said vehicle is moved to an on position and said timer means holds said timer switch closed for a preselected time.

16. A system for indicating tire pressure as defined in claim 10 wherein said timer means is activated when an ignition switch for said vehicle is moved to an on position and said timer means holds said timer switch closed for a preselected time.

17. A system for indicating tire pressure as defined in claim 11 wherein said timer means is activated when an ignition switch for said vehicle is moved to an on position and said timer means holds said timer switch closed for a preselected time.

18. A system for indicating tire pressure as defined in claim 12 wherein said timer means is activated when an ignition switch for said vehicle is moved to an on position and said timer means holds said timer switch closed for a preselected time.

* * * * *